US011336797B2

(12) United States Patent
Hikichi

(10) Patent No.: US 11,336,797 B2
(45) Date of Patent: May 17, 2022

(54) COMMUNICATION SYSTEM WITH REDUCED RISK OF LEAKAGE OF NETWORK INFORMATION, METHOD OF CONTROLLING COMMUNICATION SYSTEM, AND STORAGE MEDIUM

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/244,555

(22) Filed: Apr. 29, 2021

(65) Prior Publication Data

US 2021/0360124 A1 Nov. 18, 2021

(30) Foreign Application Priority Data

May 12, 2020 (JP) .............................. JP2020-084022

(51) Int. Cl.
*H04N 1/00* (2006.01)
*H04N 1/44* (2006.01)
(Continued)

(52) U.S. Cl.
CPC ......... *H04N 1/4433* (2013.01); *G06K 7/1417* (2013.01); *G06K 19/06037* (2013.01);
(Continued)

(58) Field of Classification Search
CPC ........... G06K 19/06037; G06K 7/1417; H04N 1/00206; H04N 1/00347; H04N 1/00795;
(Continued)

(56) References Cited

U.S. PATENT DOCUMENTS

2011/0085196 A1* 4/2011 Liu ................... G06F 3/1204
358/1.15
2014/0092425 A1* 4/2014 Park .................. G06F 3/1292
358/1.15
(Continued)

FOREIGN PATENT DOCUMENTS

JP         2014179884 A     9/2014
WO    WO-2015092971 A  *  6/2015  ............. H04W 4/80

*Primary Examiner* — Chad Dickerson
(74) *Attorney, Agent, or Firm* — Rossi, Kimms & McDowell LLP

(57) ABSTRACT

A communication system including a first communication apparatus having an image forming unit for forming an image on a sheet and a first wireless communication unit for performing wireless communication, and a second communication apparatus having a second wireless communication unit for performing wireless communication and a reading unit for reading an image. The first communication apparatus registers first network information and prints a QR code based on second network information. The second communication apparatus reads the QR code-printed sheet to acquire the second network information, requests the first communication apparatus to establish direct wireless communication based on the second network information, acquires the first network information from the first communication apparatus using the direct wireless communication, and connects to a router based on the first network information to start wireless LAN communication.

10 Claims, 11 Drawing Sheets

(51) Int. Cl.
*G06K 19/06* (2006.01)
*H04W 12/033* (2021.01)
*G06K 7/14* (2006.01)
*G06F 3/12* (2006.01)

(52) U.S. Cl.
CPC ..... *H04N 1/00206* (2013.01); *H04N 1/00347* (2013.01); *H04N 1/00795* (2013.01); *H04N 1/4486* (2013.01); *H04W 12/033* (2021.01); *H04N 2201/0094* (2013.01)

(58) Field of Classification Search
CPC .............. H04N 1/4433; H04N 1/4486; H04N 2201/0094; G06F 3/1231; G06F 3/1236; G06F 3/1291; G06F 3/1293; H04W 12/033; H04W 4/08
USPC ................................................ 358/1.11–1.18
See application file for complete search history.

(56) References Cited

U.S. PATENT DOCUMENTS

2015/0188896 A1\* 7/2015 Slick ..................... H04W 12/02
713/171
2018/0091365 A1\* 3/2018 Nakajima ........... H04L 41/0803

\* cited by examiner

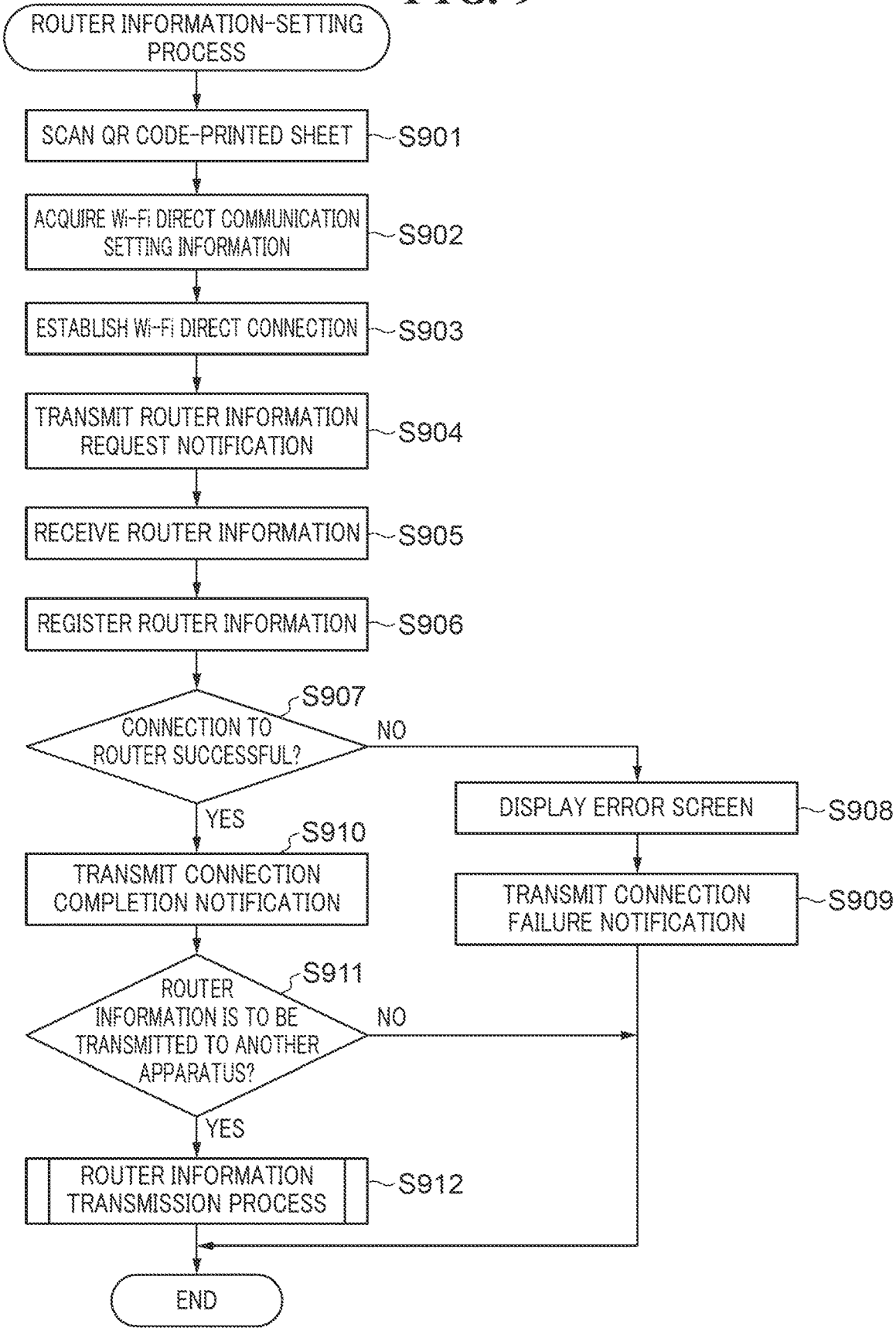

COMMUNICATION SYSTEM WITH REDUCED RISK OF LEAKAGE OF NETWORK INFORMATION, METHOD OF CONTROLLING COMMUNICATION SYSTEM, AND STORAGE MEDIUM

BACKGROUND OF THE INVENTION

Field of the Invention

The present invention relates to a communication system with a reduced risk of leakage of network information, a method of controlling the communication system, and a storage medium.

Description of the Related Art

A communication apparatus, such as a printer, is made capable of using various functions by participating in a network. In a case where a large number of communication apparatuses are caused to participate in the same network, such as in a case where a new office is set up, network settings are required to be manually set in each communication apparatus, which requires time and effort. Therefore, a service of a service person acting for this initial installation work has been widely spread. Further, as a related art, there has been proposed a technique disclosed in Japanese Laid-Open Patent Publication (Kokai) No. 2014-179884. According to the technique disclosed in Japanese Laid-Open Patent Publication (Kokai) No. 2014-179884, network information of a router is acquired by scanning a QR code and the acquired network information is registered.

To enable a service person to more efficiently perform the initial installation work, it has been studied to apply the technique disclosed in Japanese Laid-Open Patent Publication (Kokai) No. 2014-179884 to the work. That is, it has been studied to simplify the work of setting network settings, by printing a QR code generated by converting network information on a network, into which each communication apparatus is caused to participate, and causing the communication apparatus to read a sheet on which the QR code has been printed.

However, assuming that a QR code generated by converting network information of a client is printed on a sheet and a service person carries this sheet in order to cause each communication apparatus to read the QR code, there is a security risk, such as a risk of leakage of the network information of the client in case the sheet is lost. For this reason, there is a strong demand for a method of reducing time and effort of the initial installation work while reducing such a risk.

SUMMARY OF THE INVENTION

The present invention provides a communication system that is capable of reducing time and effort of an initial installation work while reducing a risk of leakage of network information, a method of controlling the communication system, and a storage medium.

In a first aspect of the present invention, there is provided a communication system including a first communication apparatus that is provided with an image forming unit configured to form an image on a sheet and a first wireless communication unit that is capable of performing wireless communication, and a second communication apparatus that is provided with a second wireless communication unit that is capable of performing wireless communication and a reading unit configured to read an image, wherein the first communication apparatus includes at least one processor or circuit configured to perform the operations of the following units: a registration unit configured to register first network information, an image formation control unit configured to cause the image forming unit to form one image based on second network information, a direct wireless communication establishment unit configured to establish direct wireless communication based on a request from the second communication apparatus, and a transmission unit configured to transmit the first network information to the second communication apparatus using the direct wireless communication according to establishment of the direct wireless communication, and wherein the second communication apparatus includes at least one processor or circuit configured to perform the operations of the following units: an acquisition unit configured to read a sheet on which the one image has been formed, using the reading unit, to acquire the second network information, a requesting unit configured to request the first communication apparatus to establish direct wireless communication, based on the second network information, another acquisition unit configured to acquire the first network information from the first communication apparatus using the direct wireless communication, and a communication control unit configured to perform control for connecting to one access point based on the first network information and starting wireless LAN communication.

In a second aspect of the present invention, there is provided a method of controlling a communication system including a first communication apparatus that is provided with an image forming unit configured to form an image on a sheet and a first wireless communication unit that is capable of performing wireless communication, and a second communication apparatus that is provided with a second wireless communication unit that is capable of performing wireless communication and a reading unit configured to read an image, comprising causing the first communication apparatus to perform: registering first network information, causing the image forming unit to form one image based on second network information, establishing direct wireless communication based on a request from the second communication apparatus, and transmitting the first network information to the second communication apparatus using the direct wireless communication according to establishment of the direct wireless communication, and causing the second communication apparatus to perform: reading a sheet on which the one image has been formed, using the reading unit, to acquire the second network information, requesting the first communication apparatus to establish direct wireless communication based on the second network information, acquiring the first network information from the first communication apparatus using the direct wireless communication, and performing control for connecting to one access point based on the first network information and starting wireless LAN communication.

According to the present invention, it is possible to reduce the time and effort of the initial installation work while reducing the risk of leakage of network information.

Further features of the present invention will become apparent from the following description of exemplary embodiments (with reference to the attached drawings).

BRIEF DESCRIPTION OF THE DRAWINGS

FIG. 9 is a flowchart of a router information-setting process performed by the image forming apparatus appearing in FIG. 6.

DESCRIPTION OF THE EMBODIMENTS

The present invention will now be described in detail below with reference to the accompanying drawings showing embodiments thereof.

Figure 1:
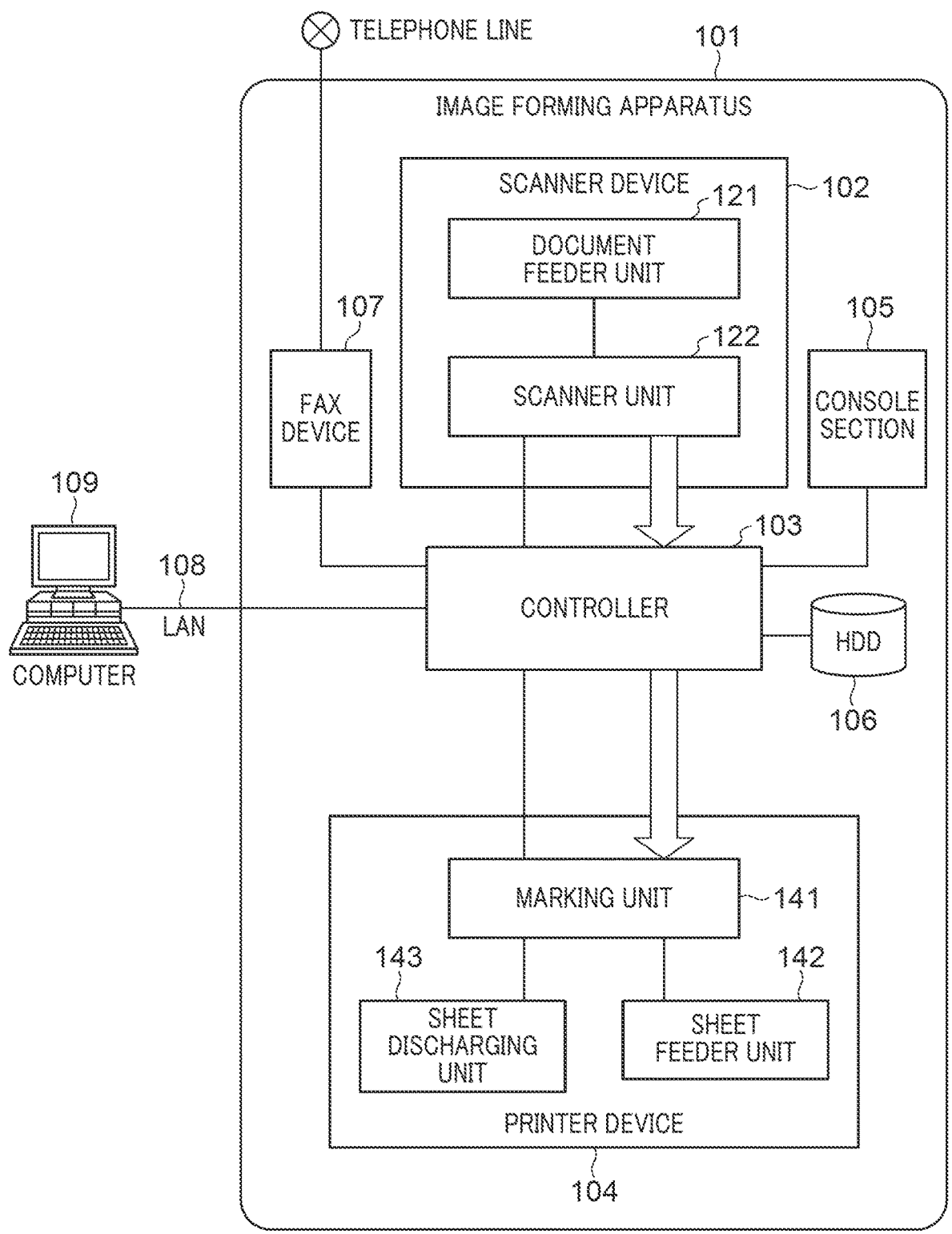
FIG. 1 is a schematic diagram showing the configuration of an image forming apparatus as a communication apparatus according to an embodiment of the present invention.

FIG. 1 is a schematic diagram showing the configuration of an image forming apparatus 101 as a communication apparatus according to an embodiment of the present invention. Referring to FIG. 1, the image forming apparatus 101 includes a scanner device 102, a controller 103, a printer device 104, a console section 105, an HDD 106, and a FAX device 107. The controller 103 is connected to the scanner device 102, the printer device 104, the console section 105, the HDD 106, and the FAX device 107.

The image forming apparatus 101 is e.g. a multifunction peripheral and is equipped with a scan function and a data transmission function. For example, the image forming apparatus 101 transmits and receives data to and from a computer 109 via a LAN 108. Further, the image forming apparatus 101 receives an instruction for operating the same and a job execution instruction from the computer 109 via the LAN 108.

The image forming apparatus 101 is further equipped with a copy function, an image transmitting function, an image storing function, an image printing function, etc. The copy function is a function that the printer device 104 prints an image read by the scanner device 102 and that the controller 103 stores the printed image in the HDD 106. The image transmitting function is a function that the controller 103 transmits an image read by the scanner device 102 to the computer 109 via the LAN 108. The image storing function is a function that the controller 103 stores an image read by the scanner device 102 in the HDD 106 and transmits the image to an external apparatus or prints the image using the printer device 104 as required. The image printing function is a function that the controller 103 analyzes e.g. PDL (Page Description Language) data received from the computer 109 and that the printer device 104 performs printing based on information obtained from the PDL data.

The scanner device 102 includes a document feeder unit 121 and a scanner unit 122. The document feeder unit 121 automatically feeds an original. The scanner unit 122 converts information obtained by optically reading an original to digital image data. The converted digital image data is sent to the controller 103.

The printer device 104 prints the digital image data on a sheet. The printer device 104 includes a sheet feeder unit 142, a marking unit 141, and a sheet discharging unit 143. The sheet feeder unit 142 feeds sheets from a sheet bundle one by one. The marking unit 141 prints image data on the sheet fed from the sheet feeder unit 142. The sheet discharging unit 143 discharges the printed sheet.

The console section 105 is a user interface for operating the image forming apparatus 101. For example, a user inputs e.g. a job execution instruction by operating the console section 105. Further, the console section 105 includes a display section 801, which is denoted as 801b in FIGS. 8A and 8B and described in association with a console section 105b of an image forming apparatus 101b as one of the image forming apparatuses 101 configured similarly. The display section 801 displays setting information of the image forming apparatus 101, etc. The HDD 106 stores digital image data, control programs, and so forth. The FAX device 107 transmits and receives digital image data to and from an external apparatus e.g. via a telephone line. The controller 103 executes a job by sending instructions to the units connected thereto.

Figure 2:
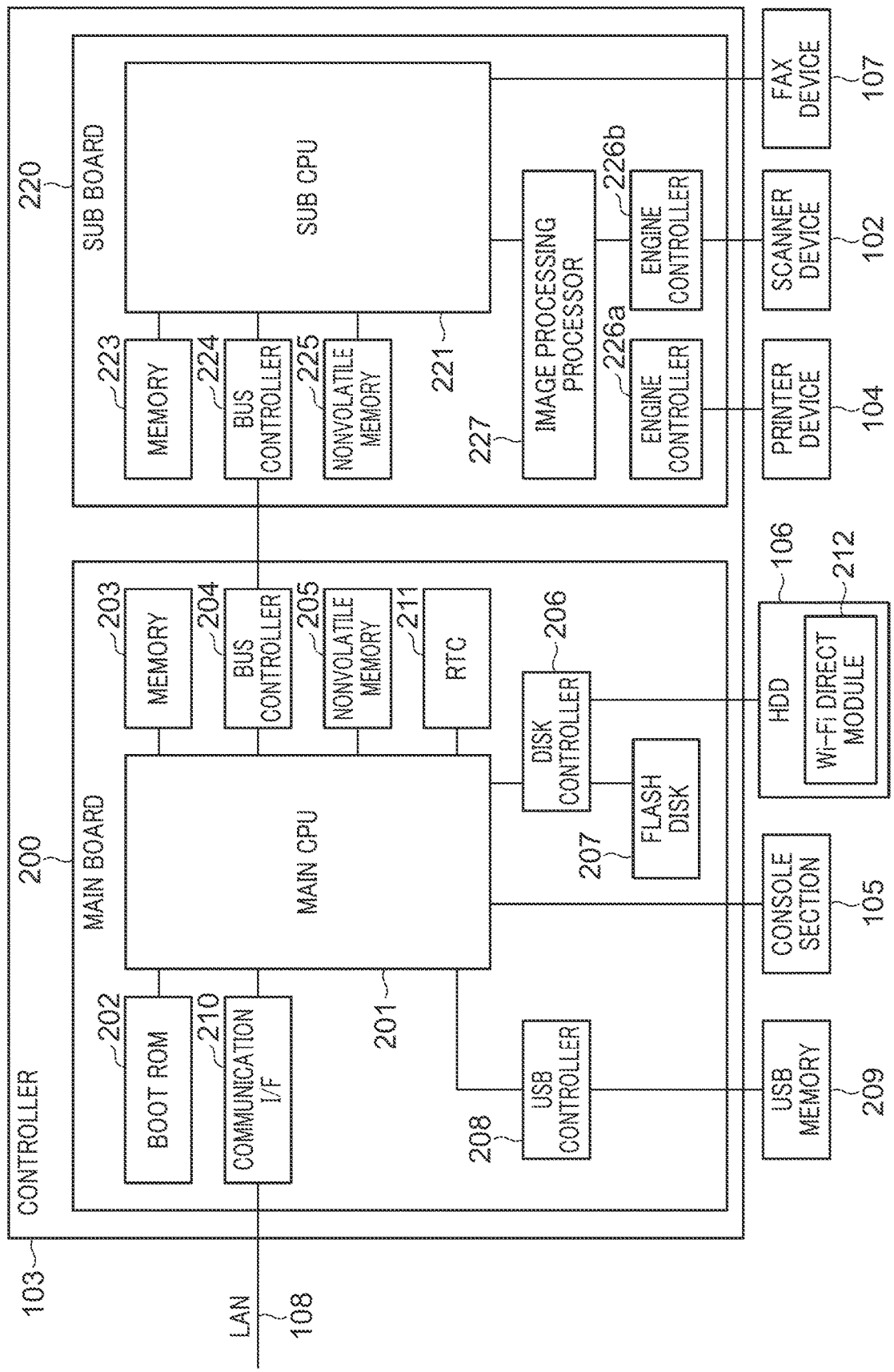
FIG. 2 is a schematic block diagram showing the configuration of a controller appearing in FIG. 1.

FIG. 2 is a schematic block diagram showing the configuration of the controller 103 appearing in FIG. 1. Referring to FIG. 2, the controller 103 includes a main board 200 and a sub board 220. The main board 200 is a general CPU system. The main board 200 includes a main CPU 201, a boot ROM 202, a memory 203, a bus controller 204, a nonvolatile memory 205, and a disk controller 206. The main board 200 further includes a flash disk 207, a USB controller 208, a communication interface 210 (communication control unit), and a RTC (Real-Time Clock) 211. The main board 200 is connected to a USB memory 209, the console section 105, the HDD 106, and so forth, which are arranged outside the main board 200.

The main CPU 201 controls the overall operation of the main board 200. The boot ROM 202 stores a boot program. The memory 203 is used as a work memory for the main CPU 201. The bus controller 204 has a bridge function for bridging to an external bus. The nonvolatile memory 205 is a storage device which is capable of storing data even when power supply is stopped. The disk controller 206 controls writing of data into the flash disk 207 or the HDD 106 or reading data from the flash disk 207 or the HDD 106. The flash disk 207 is a storage device which has a relatively small capacity and implemented by a semiconductor device, such as an SSD. The USB controller 208 controls communication with a USB device connected to the image forming apparatus 101, such as the USB memory 209. The communication interface 210 is a module used by the image forming apparatus 101 so as to perform data communication with an external apparatus and has a wireless communication function. In the present embodiment, for example, the main CPU 201 controls the communication interface 210 to perform wireless LAN communication (capable of performing wireless communication). In the wireless LAN communication, the image forming apparatus 101 performs wireless communication with an external apparatus included in the LAN 108 via an access point. Further, the main CPU 201 performs direct wireless communication using a Wi-Fi direct module 212 stored e.g. in the HDD 106. In the direct wireless communication, the image forming apparatus 101 directly performs wireless communication with an external apparatus without using an access point. The direct wireless communication is e.g. a Wi-Fi direct communication in which Wi-Fi devices directly perform wireless communication with each other without using an access point. Radio waves of a 2.4 GHz band or 5 GHz band are used for Wi-Fi direct, and the image forming apparatus 101 is capable of communicating with a Wi-Fi device approximately ten to several tens meters away. Note that in the present embodiment, the communication interface 210 may be configured to be capable of simultaneously performing direct wireless communication and wireless LAN communication or may be configured to be incapable of simultaneously operating direct wireless communication and wireless LAN communication. The RTC 211 has a clock function.

The sub board 220 is comprised of a general CPU system smaller than that of the main board 200 and image processing hardware. The general CPU system includes e.g. a sub CPU 221, a memory 223, a bus controller 224, and a nonvolatile memory 225. The image processing hardware includes e.g. an image processing processor 227 and engine controllers 226a and 226b. The sub board 220 is connected to the scanner device 102, the printer device 104, the FAX device 107, and so forth, which are arranged outside the sub board 220.

The sub CPU 221 controls the overall operation of the sub board 220. Further, the sub CPU 221 directly controls the FAX device 107 connected to the sub board 220. The memory 223 is used as a work memory for the sub CPU 221. The bus controller 224 has a bridge function for bridging an external bus. The nonvolatile memory 225 is a storage device which is capable of storing data even when power supply is stopped. The image processing processor 227 performs real-time digital image data processing. The engine controller 226a controls transmission of digital image data to the printer device 104 connected to the sub board 220. The engine controller 226b controls reception of digital image data from the scanner device 102 connected to the sub board 220. Note that FIG. 2 shows the configurations of the main board 200 and the sub board 220 in a simplified manner, and the configurations of the main board 200 and the sub board 220 are not limited to these. For example, the main board 200 and the sub board 220 may be further each provided with a chip set, a bus bridge, a clock generator, etc., as the peripheral hardware of the CPU.

Next, the operation of the controller 103 will be described using a process for copying an image onto a sheet, by way of example.

When a user inputs an instruction for executing the image copying process to the console section 105, the main CPU 201 sends an image reading command to the scanner device 102 via the sub CPU 221. Upon receipt of the image reading command, the scanner device 102 converts information obtained by optically reading an original to digital image data and sends the digital image data to the image processing processor 227 via the engine controller 226b. The image processing processor 227 DMA-transfers the received digital image data to the memory 223 via the sub CPU 221 to temporarily store the digital image data in the memory 223.

When the main CPU 201 confirms that most or all of the digital image data has been stored in the memory 223, the main CPU 201 instructs the sub CPU 221 to output the digital image data. The sub CPU 221 having received this instruction sends an instruction including the address of the memory 223, where the digital image data has been stored, to the image processing processor 227. The digital image data in the memory 223 is sent to the printer device 104 via the image processing processor 227 and the engine controller 226a, according to a synchronization signal output from the printer device 104. The printer device 104 prints the received digital image data on a sheet.

In a case where a plurality of copies are to be printed, the main CPU 201 stores the digital image data stored in the memory 223, into the HDD 106. With this, when the second and subsequent copies are printed, the digital image data to be printed can be sent from the HDD 106 or the memory 223 to the printer device 104 without acquiring the digital image data from the scanner device 102.

Incidentally, in a case where a communication system 300, shown in FIG. 3, which include a plurality of image forming apparatuses 101a to 101n each of which has the same functions and configuration as those of the above-described image forming apparatus 101, is introduced, for example, a service person goes to a place where the plurality of image forming apparatuses 101a to 101n are installed (hereinafter referred to as the "user environment") and performs an initial installation work. In the initial installation work, the service person performs initialization of the plurality of image forming apparatuses 101a to 101n. The initialization includes e.g. setting network settings for connecting the plurality of image forming apparatuses 101a to 101n to a router 301 which is an access point for performing wireless LAN communication in the user environment, installation of application programs, and setting a function release license.

Figure 4:
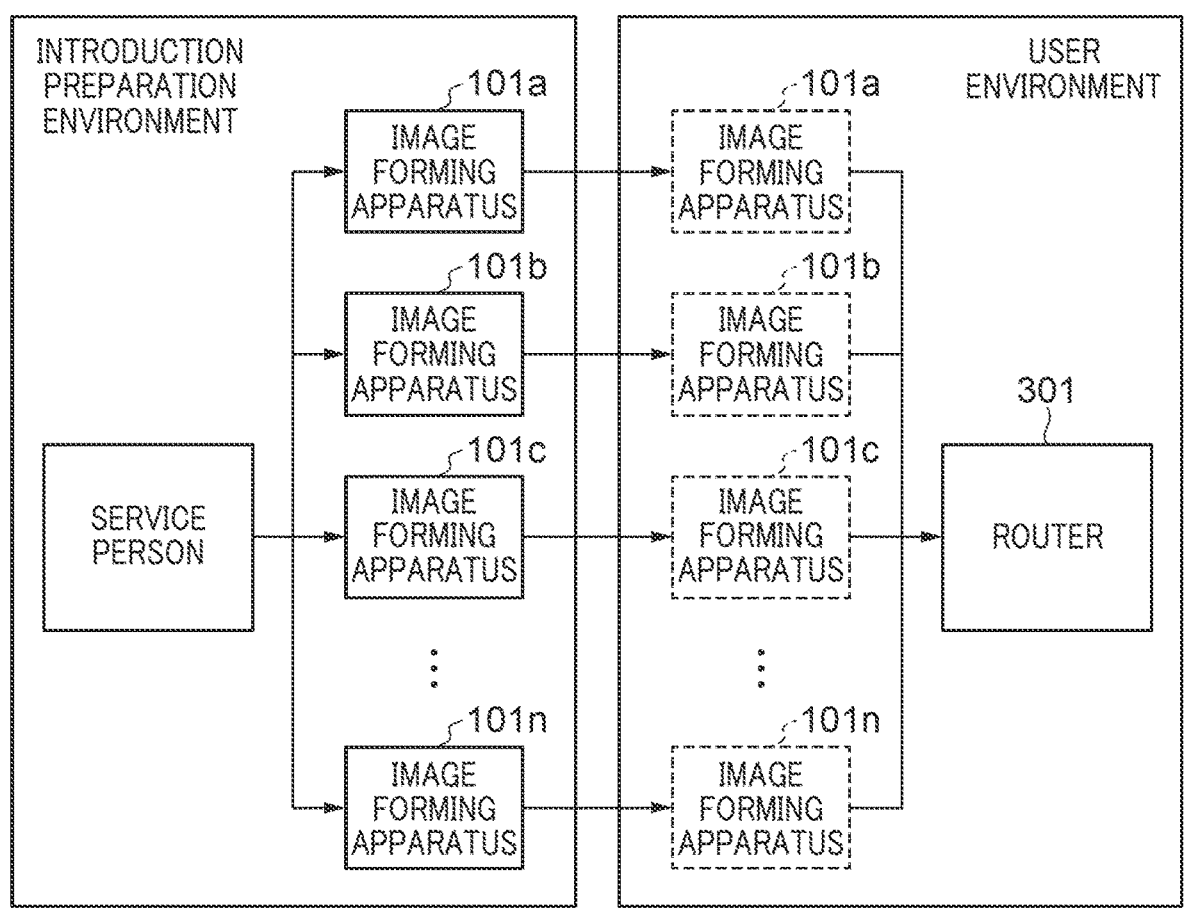
FIG. 4 is a diagram useful in explaining an initial installation work for the image forming apparatus.

Further, as another method, as shown in FIG. 4, it is also considered that the service person performs initialization of the image forming apparatuses 101a to 101n at a place different from the user environment (hereinafter referred to as the "introduction preparation environment") in advance, and installs the initialized image forming apparatuses 101a to 101n in the user environment. However, in both of the above-described methods, a user is required to provide information necessary for the initialization to the service person. The information necessary for the initialization includes important information, such as an SSID (Service Set Identifier), a password, and an encryption method of the router 301 used in the user environment, leakage of which to the outside is desired to be avoided, and it is not preferable from the viewpoint of security to provide such information to the service person. Further, in both of the above-described methods, the service person is required to perform initialization of the image forming apparatuses 101a to 101n, one by one, which increases the number of working steps required for the initialization.

As a method of improving the working efficiency of the initialization, there has been proposed, for example, a method of printing a QR code generated by converting router information of the router 301, such as the SSID, the password, and the encryption method, on a sheet. The service person sets the router information by causing the image forming apparatuses 101a to 101n to read the QR code. However, in the method of printing a QR code generated by converting the router information, on a sheet, anyone can acquire the router information from the printed sheet by using an apparatus capable of reading a QR code, such as a smartphone and a tablet terminal, and hence the risk of leakage of the router information is very high. For this reason, there is a strong demand for a method of reducing time and effort of the initial installation work while reducing the risk of leakage of the router information.

To cope with this, in the present embodiment, the image forming apparatus 101a, for which the router information has been set, prints a QR code generated by converting communication setting information of direct wireless communication, on a sheet. The image forming apparatus 101b, for which the router information has not been set, establishes direct wireless communication with the image forming apparatus 101a based on the communication setting information of direct wireless communication, which is acquired by reading the sheet on which the QR code has been printed. Further, the image forming apparatus 101b acquires the router information from the image forming apparatus 101a via direct wireless communication, and starts wireless LAN communication with the image forming apparatus 101a based on the acquired router information.

Figure 3:
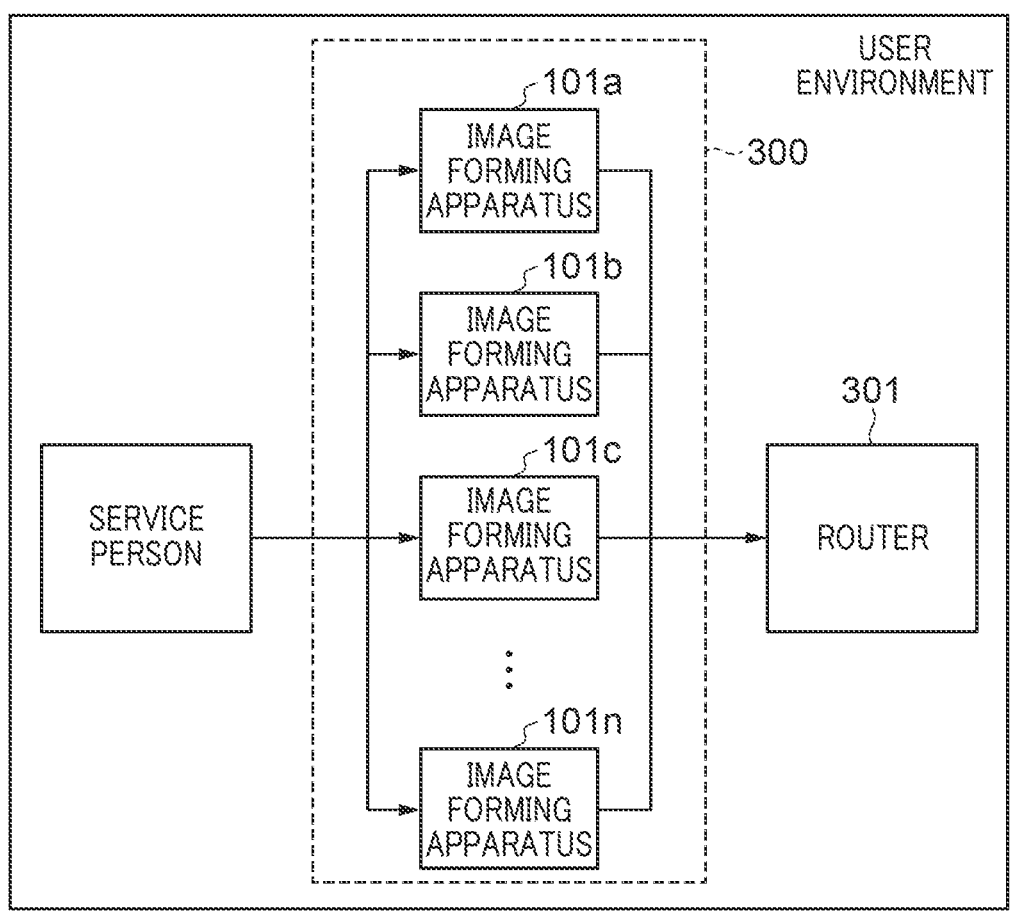
FIG. 3 is a diagram useful in explaining an installation environment of the image forming apparatus.
Figure 5:
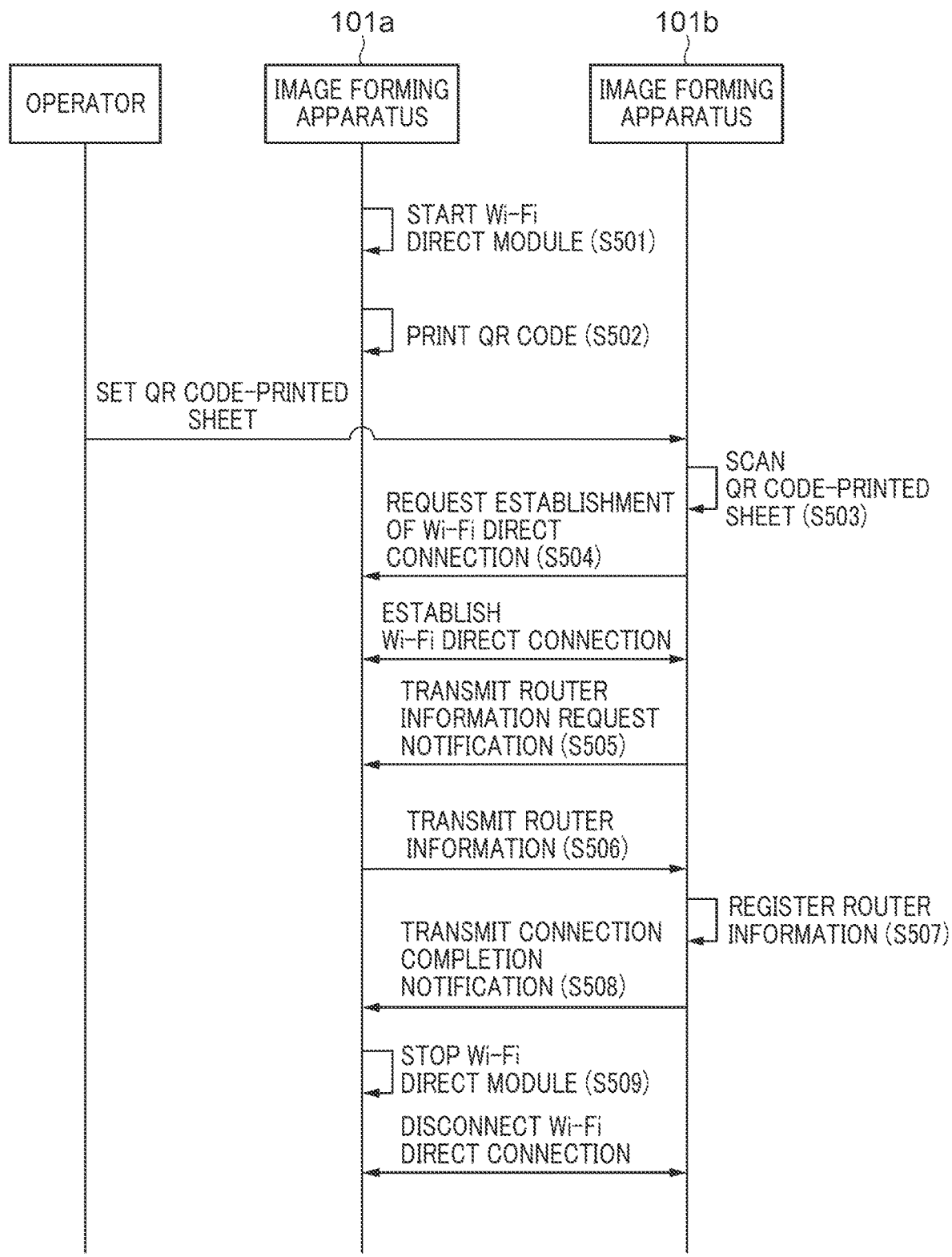
FIG. 5 is a sequence diagram useful in explaining a flow of initialization of a communication system shown in FIG. 3.
Figure 6:
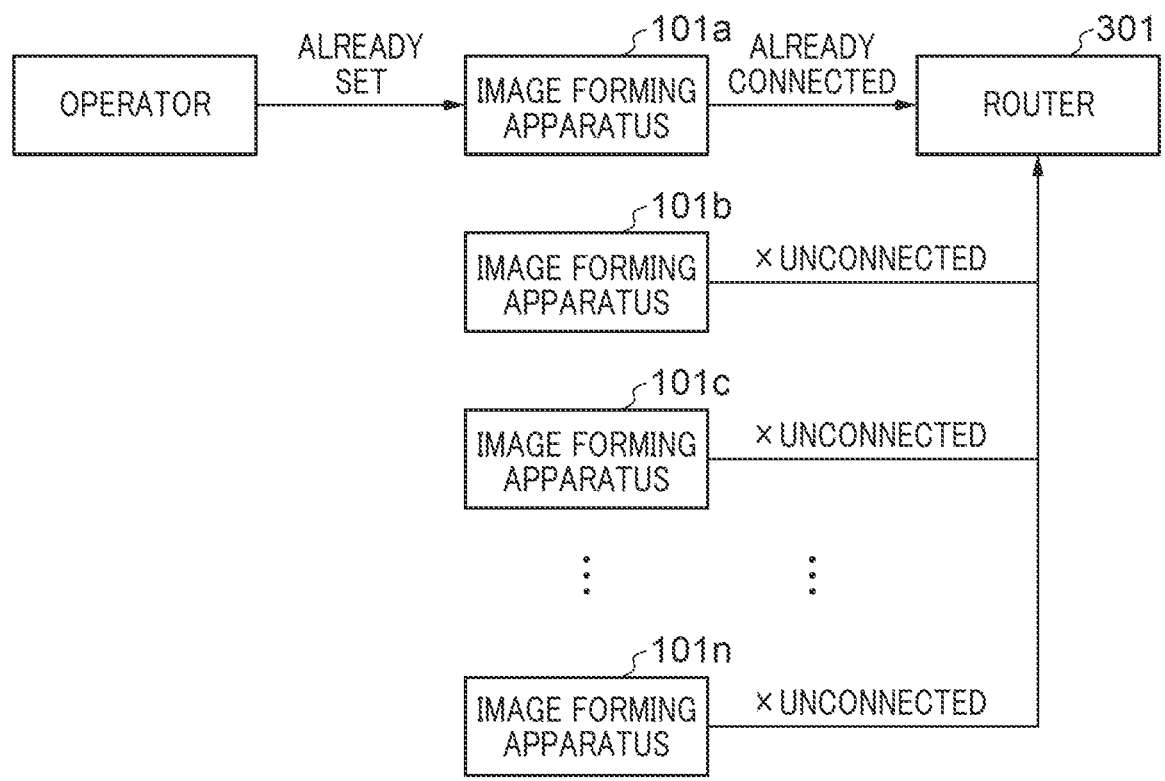
FIG. 6 is a diagram useful in explaining a state of connection of each image forming apparatus to a router in the communication system shown in FIG. 3.

FIG. 5 is a sequence diagram useful in explaining a flow of the initialization of the communication system 300 shown in FIG. 3. In FIG. 5, it is assumed that out of the image forming apparatuses 101a to 101n, only the image forming apparatus 101a for which the initialization has been completed is connected to the router 301 as shown in FIG. 6 and performs the initialization for the image forming apparatus 101b, by way of example. Note that as described hereinabove, the image forming apparatuses 101a to 101n have the same configuration as that of the image forming apparatus 101, and in the following description, the components of the image forming apparatus 101a are denoted by adding a suffix "a" to the end of the reference numeral of each component of the image forming apparatus 101. Further, the components of the image forming apparatus 101b are denoted by adding a suffix "b" to the end of the reference numeral of each component of the image forming apparatus 101.

Figure 7A:
FIGS. 7A and 7B are diagrams each showing an example of a QR code printed by the image forming apparatus according to the present embodiment.
Figure 7B:
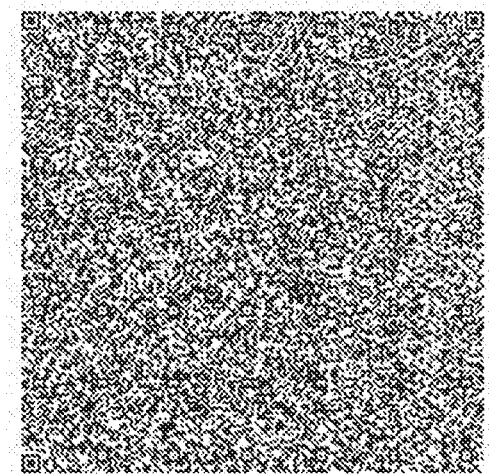

Referring to FIG. 5, first, the image forming apparatus 101a starts up the Wi-Fi direct module 212a according to an instruction provided by an operator, such as a service person (step S501). Then, the image forming apparatus 101a converts the Wi-Fi direct communication setting information to a QR code. Note that the format of the QR code may be any format, such as a Version 4 format (see e.g. FIG. 7A) that can express several tens of characters or a Version 40 format (see e.g. FIG. 7B) that can express a number, not smaller than one thousand, of characters. The Wi-Fi direct communication setting information is information related to an SSID, a password, and an encryption method of the image forming apparatus 101a used for Wi-Fi direct, and is different from the above-described router information. Further, as the SSID and the password of the image forming apparatus 101a, which are included in the Wi-Fi direct communication setting information, different values are issued whenever the Wi-Fi direct module 212a is started. That is, the Wi-Fi direct communication setting information of the image forming apparatus 101a is information which can be used only during the activated state of the Wi-Fi direct module 212a. Then, the image forming apparatus 101a prints the QR code on a sheet (step S502) (image formation control unit).

Figure 8A:
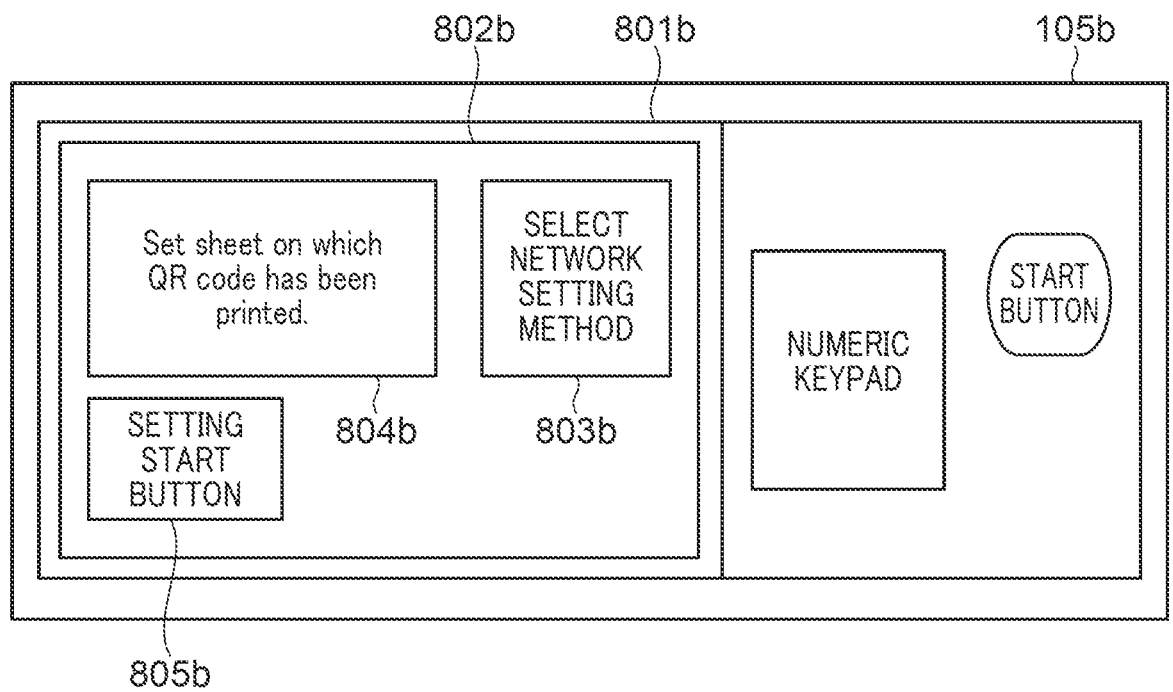
FIGS. 8A and 8B are diagrams each showing an example of a screen displayed on a console section of the image forming apparatus according to the present embodiment.

On the other hand, in the image forming apparatus 101b, a router information-setting screen 802b is displayed on the display section 801b, which is of touch panel type, appearing in FIG. 8A, of the console section 105b. The router information-setting screen 802b includes a network setting method selection area 803b, a message display area 804b, and a setting start button 805b. In the network setting method selection area 803b, a network setting method for the image forming apparatus 101b is set. In a case where the operator selects setting of network settings using Wi-Fi direct connection in the network setting method selection area 803b, a message for prompting the operator to set the sheet on which the QR code has been printed (hereinafter referred to as the "QR code-printed sheet") on the image forming apparatus 101b is displayed in the message display area 804b.

Figure 8B:
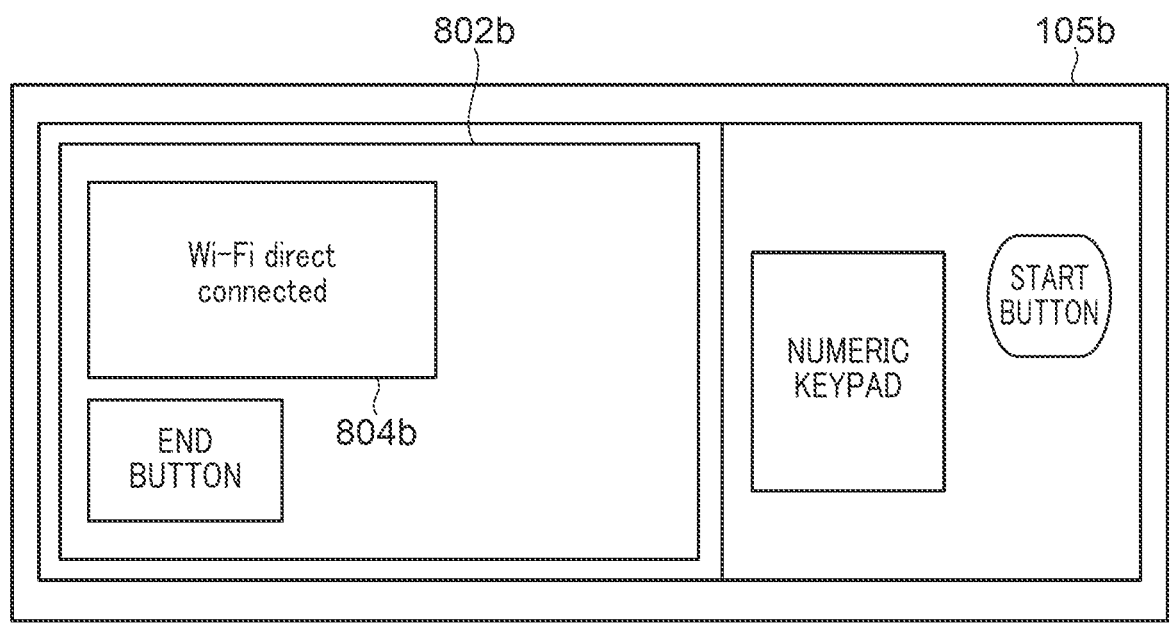

When the operator sets the QR code-printed sheet printed by the image forming apparatus 101a on the image forming apparatus 101b and selects the setting start button 805b, the image forming apparatus 101b scans the QR code-printed sheet (step S503) (reading unit) to acquire the Wi-Fi direct communication setting information from the QR code-printed sheet. The image forming apparatus 101b requests the image forming apparatus 101a to establish Wi-Fi direct connection using the acquired Wi-Fi direct communication setting information (step S504). The image forming apparatus 101a having received this request establishes Wi-Fi direct connection to the image forming apparatus 101b (direct wireless communication establishment unit). This enables the image forming apparatus 101b to perform data communication using Wi-Fi direct connection to the image forming apparatus 101a. When the image forming apparatus 101b has established Wi-Fi direct connection to the image forming apparatus 101a, a message to the effect that Wi-Fi direct connection has been established is displayed on the message display area 804b of the image forming apparatus 101b, as shown in FIG. 8B.

Then, the image forming apparatus 101b transmits a router information request notification to the image forming apparatus 101a via Wi-Fi direct (step S505).

The image forming apparatus 101a having received this request notification transmits the router information already registered in the image forming apparatus 101a to the image forming apparatus 101b (step S506).

The image forming apparatus 101b registers the acquired router information (step S507). This enables the image forming apparatus 101b to connect to the router 301 and perform wireless LAN communication via the router 301. When connection to the router 301 is completed, the image forming apparatus 101b transmits a connection completion notification indicating this fact to the image forming apparatus 101a (step S508). The image forming apparatus 101a having received the connection completion notification stops the Wi-Fi direct module 212a (step S509). As a result, Wi-Fi direct connection between the image forming apparatus 101a and the image forming apparatus 101b is disconnected. After that, the image forming apparatus 101b is no longer capable of establishing Wi-Fi direct connection to the image forming apparatus 101a even when the Wi-Fi direct communication setting information of the image forming apparatus 101a, which is read from the QR code-printed sheet printed in the step S502, is used.

Thus, in the present embodiment, the operator can easily set network settings for the image forming apparatus 101b without inputting the router information to the console section 105b of the image forming apparatus 101b. Further, since it is easy to perform an operation for setting network settings using the QR code-printed sheet, not a service person, but an administrator of the user environment, for example, sets network settings for the image forming apparatus 101a in the communication system 300, and a user of an image forming apparatus who does not know the router information in the user environment can also set network settings for another image forming apparatus.

FIG. 9 is a flowchart of a router information-setting process performed by the image forming apparatus appearing 101b in FIG. 6. In the process in FIG. 9, the image forming apparatus 101b acquires the router information from the image forming apparatus 101a by using Wi-Fi direct connection and transmits the acquired router information to another image forming apparatus. The process in FIG. 9 is realized by a controller 103b of the image forming apparatus 101b executing a program stored e.g. in the HDD 106b. The process in FIG. 9 is executed when an operator sets a QR code-printed sheet on the image forming apparatus 101b according to a message displayed on the display section 801b of the console section 105b and further selects the setting start button 805b. In the following description, it is assumed that a QR code-printed sheet printed by the image forming apparatus 101a is set on the image forming apparatus 101b, by way of example.

Referring to FIG. 9, the controller 103b scans the set QR code-printed sheet (step S901) and acquires the Wi-Fi direct communication setting information of the image forming apparatus 101a from the QR code-printed sheet (step S902). Then, the controller 103b starts up the Wi-Fi direct module 212b to establish Wi-Fi direct connection to the image forming apparatus 101a using the acquired Wi-Fi direct communication setting information (step S903). This enables the image forming apparatus 101b to perform data communication with the image forming apparatus 101a via Wi-Fi direct. Then, the controller 103b transmits a router information request notification to the image forming apparatus 101a via Wi-Fi direct (step S904).

Then, the controller 103b receives the router information transmitted by the image forming apparatus 101a in response to the router information request notification (step S905) and registers the received router information (step S906). Then, the controller 103b determines whether or not connection to the router 301 associated with the registered router information is successful (step S907).

If it is determined in the step S907 that connection to the router 301 has failed, the controller 103b displays an error screen on the display section 801b of the console section 105b (step 908). Further, the controller 103b stops the Wi-Fi direct module 212b, and transmits a connection error notification indicating failure of connection to the router 301 to the image forming apparatus 101a (step S909). The image forming apparatus 101a having received the connection failure notification stops the Wi-Fi direct module 212a, and thus the present router information-setting process is terminated.

If it is determined in the step S907 that connection to the router 301 is successful, the controller 103b transmits a connection completion notification indicating completion of connection to the router 301 to the image forming apparatus 101a (step S910). The image forming apparatus 101a having received the connection completion notification stops the Wi-Fi direct module 212a based on the settings set in advance or remains on standby until a request for establishing Wi-Fi direct connection is received from another image forming apparatus.

Then, the controller 103b displays a selection screen (not shown) for prompting a user to select whether or not to transmit the router information to another apparatus, on the display section 801b of the console section 105b. Then, the controller 103b determines whether or not to transmit the router information to another apparatus based on user's selection on this selection screen (step S911).

If it is determined in the step S911 that the router information is not to be transmitted to another apparatus, the controller 103b stops the Wi-Fi direct module 212b, followed by terminating the present router information-setting process. If it is determined in the step S911 that the router information is to be transmitted to another apparatus, the controller 103b performs a router information transmission process, described hereinafter with reference to FIG. 10 (step S912), followed by terminating the router information-setting process.

Figure 10:
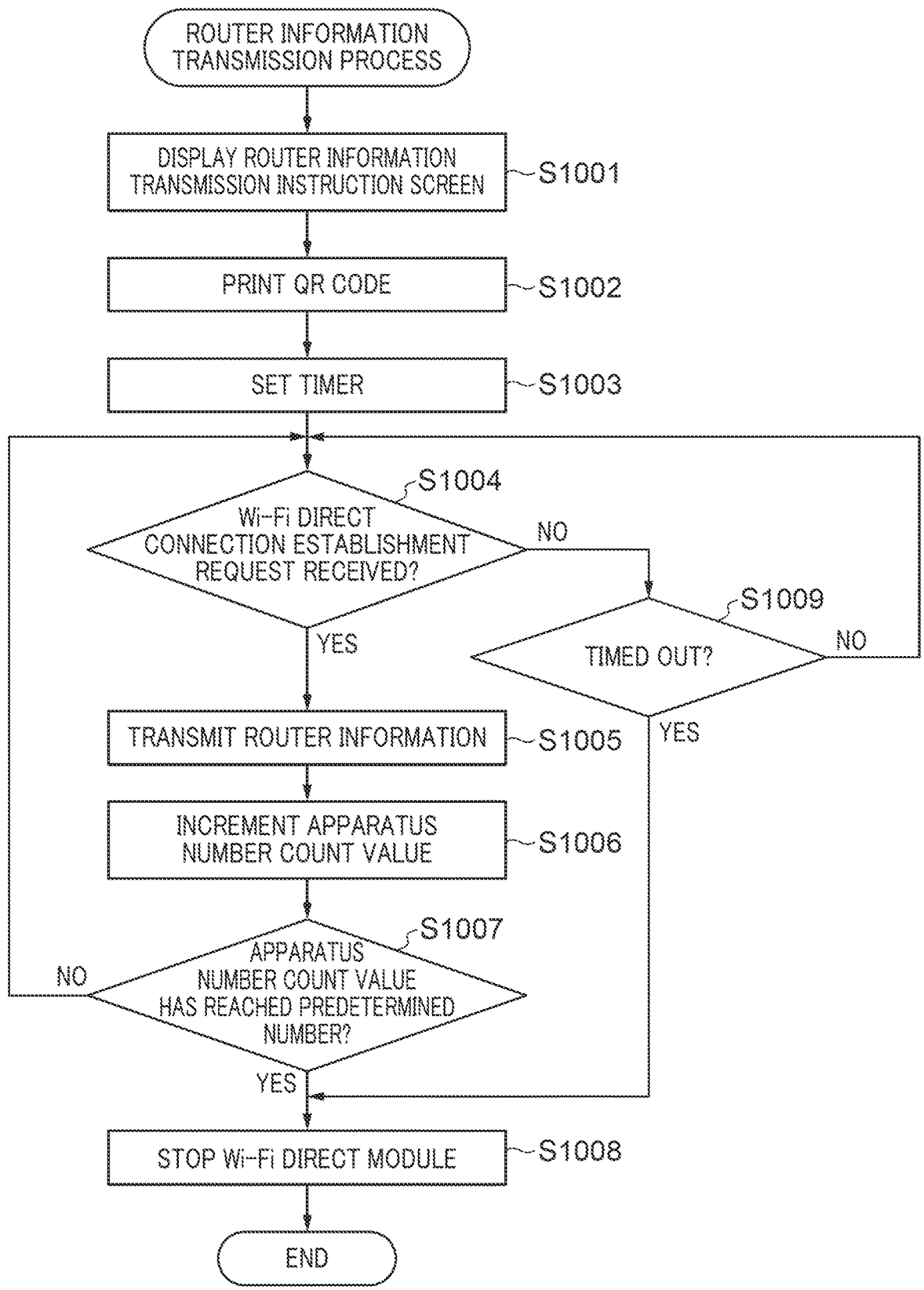
FIG. 10 is a flowchart of a router information transmission process in a step S912 in FIG. 9.

FIG. 10 is a flowchart of the router information transmission process in the step S912 in FIG. 9. Note that when the process in FIG. 10 is started, the Wi-Fi direct module 212b of the image forming apparatus 101b has been activated.

Figure 11A:
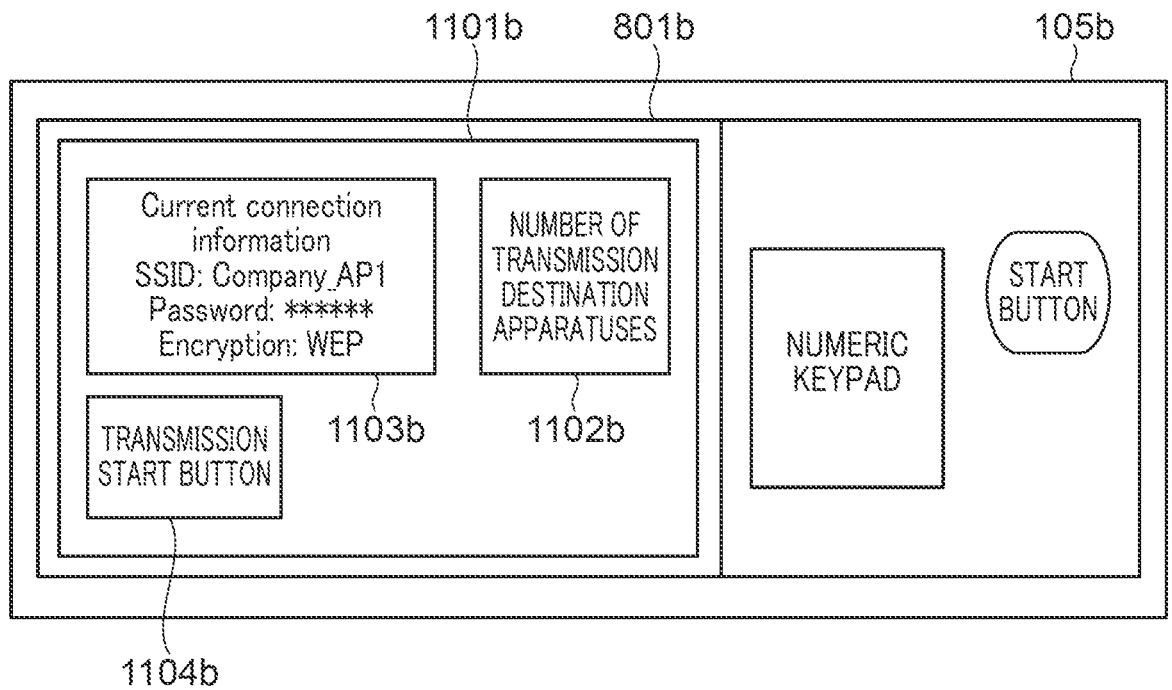
FIGS. 11A and 11B are diagrams each showing an example of a screen displayed on the console section of the image forming apparatus according to the present embodiment.
Figure 11B:
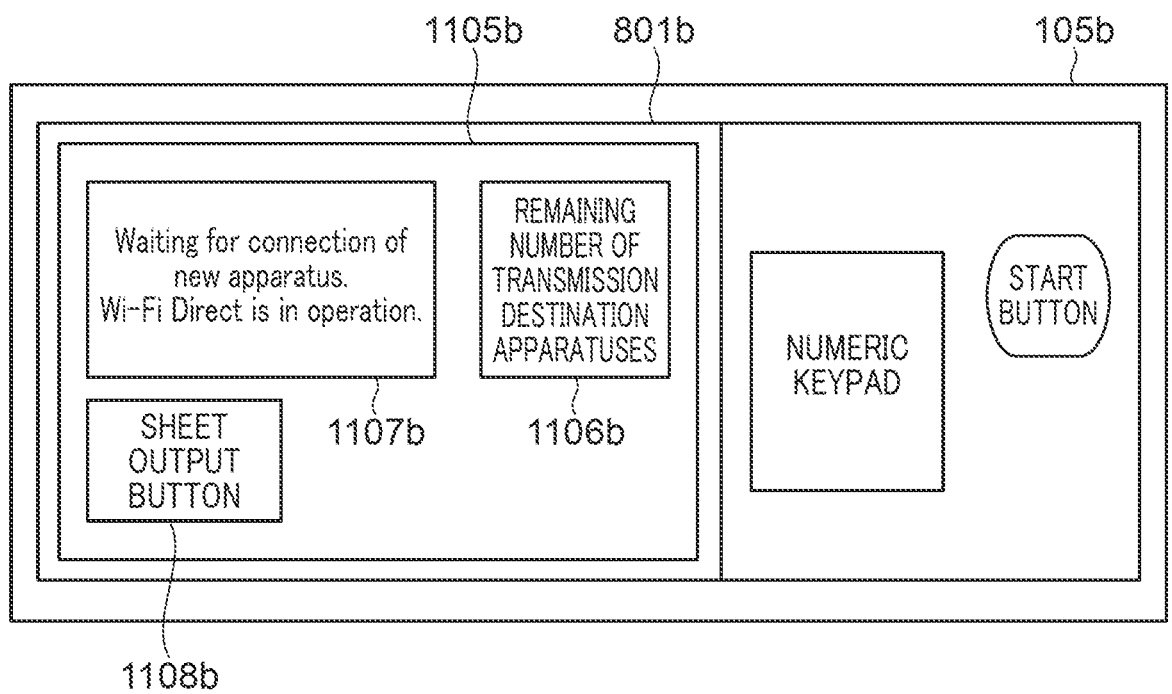

Referring to FIG. 10, the controller 103b displays a router information transmission instruction screen 1101b, appearing in FIG. 11A, on the display section 801b of the console section 105b (step S1001). The router information transmission instruction screen 1101b includes a transmission destination apparatus number-setting area 1102b, a display area 1103b, and a transmission start button 1104b. In the transmission destination apparatus number-setting area 1102b, the number of apparatuses to which the image forming apparatus 101b is to transmit the router information is set. In the display area 1103b, specific values of the router information registered in the step S906, including the SSID, the password, and the encryption method of the router 301, are displayed. When the transmission start button 1104b is pressed in a state in which the number of apparatuses to which the image forming apparatus 101b is to transmit the router information has been set in the transmission destination apparatus number-setting area 1102b, the router information transmission instruction screen 1101b in the display section 801b is changed to an output instruction screen 1105b appearing in FIG. 11B.

The output instruction screen 1105b includes a remaining transmission destination apparatus number display area 1106b, a display area 1107b, and a sheet output button 1108b. In the remaining transmission destination apparatus number display area 1106b, the remaining number of apparatuses to which the image forming apparatus 101b is to transmit the router information is displayed. In the display area 1107b, a message is displayed indicating that the image forming apparatus 101b is in a state of waiting for a request for establishing Wi-Fi direct connection from another apparatus. The sheet output button 1108b is a button for instructing output of a QR code-printed sheet. When the operator selects the sheet output button 1108b, the controller 103b causes the QR code generated by converting the Wi-Fi direct communication setting information of the image forming apparatus 101b to be printed on a sheet (step S1002). The Wi-Fi direct communication setting information of the image forming apparatus 101b is information related to the SSID, the password, and the encryption method of the image forming apparatus 101b, for use in Wi-Fi direct connection, and is different from the router information and the above-mentioned Wi-Fi direct communication setting information of the image forming apparatus 101a. Further, different values are issued as the SSID and the password of the image forming apparatus 101b whenever the Wi-Fi direct module 212b is started. That is, the Wi-Fi direct communication setting information of the image forming apparatus 101b is information which can be used only during the activated state of the Wi-Fi direct module 212b.

Then, the controller 103b sets a timer (not shown) (step S1003) and determines whether or not a request for establishing Wi-Fi direct connection has been received from another apparatus (step S1004). The determination in the step S1004 is periodically performed at a time set in advance or at predetermined time intervals.

If it is determined in the step S1004 that a request for establishing Wi-Fi direct connection has been received from another apparatus, e.g. the image forming apparatus 101c, the controller 103b establishes Wi-Fi direct connection to the image forming apparatus 101c, and when a notification for requesting the router information is received from the image forming apparatus 101c via Wi-Fi direct, the controller 103b transmits the router information to the image forming apparatus 101c via Wi-Fi direct (step S1005). Then, the controller 103b increments an apparatus number count value indicative of the number of apparatuses to which the router information has been transmitted (step S1006). Then, the controller 103b determines whether or not the apparatus number count value has reached the predetermined number set in the transmission destination apparatus number-setting area 1102b (step S1007).

If it is determined in the step S1007 that the apparatus number count value has not reached the predetermined number, the router information transmission process returns to the step S1004. If it is determined in the step S1007 that the apparatus number count value has reached the predetermined number, the controller 103b stops the Wi-Fi direct module 212b (step S1008), followed by terminating the router information transmission process.

If it is determined in the step S1004 that a request for establishing Wi-Fi direct connection has not been received from any other apparatus, the controller 103b determines whether or not the timer set in the step S1003 has timed out (step S1009).

If it is determined in the step S1009 that the timer has timed out, the router information transmission process proceeds to the step S1008. That is, in the present embodiment, in a case where a predetermined time period elapses after the QR code-printed sheet has been printed, the Wi-Fi direct module 212b is stopped. If it is determined in the step S1009 that the timer has not timed out, the router information transmission process returns to the step S1004.

By performing the above-described process in FIG. 10 for the image forming apparatuses 101c to 101n, the operator can easily set network settings for the image forming apparatuses 101c to 101n without inputting the router information to each of the console sections of the image forming apparatuses 101c to 101n.

According to the above-described embodiment, the image forming apparatus 101b in which the router information has been registered prints the QR code generated by converting the Wi-Fi direct communication setting information of the image forming apparatus 101b, on a sheet. The image forming apparatus 101c for which the router information has not been set establishes Wi-Fi direct connection to the image forming apparatus 101b based on the Wi-Fi direct communication setting information of the image forming apparatus 101b, which is acquired by reading the sheet on which the QR code has been printed. Further, the image forming apparatus 101c acquires the router information from the image forming apparatus 101b via Wi-Fi direct and performs wireless LAN communication with the image forming apparatus 101b based on the acquired router information. Thus, the operator can easily set network settings for the image forming apparatus 101c without inputting the router information to the console section 105c of the image forming apparatus 101c and thereby reduce the time and effort of the initial installation work. Further, since a QR code generated by converting the router information is not included in the QR code-printed sheet, it is possible to reduce the risk of leakage of the router information. In short, in the present embodiment, it is possible to reduce the time and effort of the initial installation work while reducing the risk of leakage of the router information.

Further, in the above-described embodiment, the Wi-Fi direct communication setting information is the network information used for Wi-Fi direct connection. Therefore, it is possible to reduce the risk of leakage of the information necessary for wireless LAN communication.

Further, in the above-described embodiment, the Wi-Fi direct communication setting information is the network information of the image forming apparatus 101b, which can be used only during the activated state of the Wi-Fi direct module 212b. This makes it possible to reduce the risk of leakage of the Wi-Fi direct communication setting information.

In the above-described embodiment, in a case where the number of apparatuses to which the router information has been transmitted has reached the predetermined number set in advance, the Wi-Fi direct module 212b is stopped. This makes it possible to prevent the use of the Wi-Fi direct communication setting information read from the QR code-printed sheet upon completion of transmission of the router information to a number, designated by a user, of apparatuses.

Further, in the above-described embodiment, in a case where a predetermined time period elapses after the QR code-printed sheet has been printed, the Wi-Fi direct module 212b is stopped. This makes it possible to prevent use of the Wi-Fi direct communication setting information read from the QR code-printed sheet when the predetermined time period elapses after the QR code-printed sheet has been printed.

Although the present invention is described using the above-described embodiment, the present invention is not limited to the above-described embodiment. For example, the image forming apparatus 101a which has been initialized may start the Wi-Fi direct module 212a and perform the router information transmission process in FIG. 9.

Although in the above-described embodiment, the description is given of the case where direct wireless communication is Wi-Fi direct, direct wireless communication is not limited to Wi-Fi direct. For example, direct wireless communication may be wireless communication using Bluetooth.

Further, in the above-described embodiment, in a case where direct wireless communication is wireless communication using Bluetooth, the image forming apparatus 101 may be configured to have not only the communication interface 210, but also another communication interface for performing wireless communication using Bluetooth.

In the above-described embodiment, encrypted Wi-Fi direct communication setting information may be converted to a QR code, and a QR code-printed sheet on which the QR code has been printed may be output. By printing the QR code generated by converting the encrypted Wi-Fi direct communication setting information, even if the Wi-Fi direct communication setting information can be acquired by reading the QR code-printed sheet, since the Wi-Fi direct communication setting information has been encrypted, it is possible to reduce the risk of leakage of the Wi-Fi direct communication setting information.

In the above-described embodiment, in a case where the image forming apparatus 101 is equipped with a camera, the QR code may be read not by the scanner device 102, but by the camera.

In the above-described embodiment, a smartphone, a tablet terminal, or the like, operated by an operator may acquire the Wi-Fi direct communication setting information by reading the QR code-printed sheet and transmit the acquired Wi-Fi direct communication setting information to an apparatus other than the apparatus which has printed the QR code-printed sheet by short-range wireless communication using NFC (Near Field Communication).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-084022, filed May 12, 2020, which is hereby incorporated by reference herein in its entirety.

What is claimed is:

1. A communication system including:
    a first communication apparatus that is provided with an image forming unit configured to form an image on a sheet and a first wireless communication unit that is capable of performing wireless communication, and
    a second communication apparatus that is provided with a second wireless communication unit that is capable of performing wireless communication and a reading unit configured to read an image,
    wherein the first communication apparatus includes at least one processor or circuit configured to perform the operations of the following units:
    a registration unit configured to register first network information;
    an image formation control unit configured to cause the image forming unit to form one image based on second network information;
    a direct wireless communication establishment unit configured to establish direct wireless communication based on a request from the second communication apparatus; and
    a transmission unit configured to transmit the first network information to the second communication apparatus using the direct wireless communication according to establishment of the direct wireless communication, and
    wherein the second communication apparatus includes at least one processor or circuit configured to perform the operations of the following units:
    an acquisition unit configured to read a sheet on which the one image has been formed, using the reading unit, to acquire the second network information;
    a requesting unit configured to request the first communication apparatus to establish direct wireless communication, based on the second network information;
    another acquisition unit configured to acquire the first network information from the first communication apparatus using the direct wireless communication; and
    a communication control unit configured to perform control for connecting to one access point based on the first network information and starting wireless LAN communication.

2. The communication system according to claim 1, wherein the second network information is network information used for the direct wireless communication.

3. The communication system according to claim 1, wherein the first communication apparatus further includes a direct wireless communication unit for performing the direct wireless communication, and
    wherein the second network information is network information of the first communication apparatus, which can be used only during an activated state of the direct wireless communication unit.

4. The communication system according to claim 3, wherein the communication system includes a plurality of the second communication apparatuses, and
    wherein in a case where the number of the second communication apparatuses to which the first network information has been transmitted by the transmission unit reaches a predetermined number set in advance, the direct wireless communication unit is stopped.

5. The communication system according to claim 3, wherein in a case where a predetermined time period elapses after the one image has been formed on a sheet, the direct wireless communication unit is stopped.

6. The communication system according to claim 1, wherein the one image is a QR code generated by converting the second network information.

7. The communication system according to claim 6, wherein the one image is a QR code generated by converting the second network information which is encrypted.

8. The communication system according to claim 1, wherein the first communication apparatus and the second communication apparatus are image forming apparatuses.

9. A method of controlling a communication system including a first communication apparatus that is provided with an image forming unit configured to form an image on a sheet and a first wireless communication unit that is capable of performing wireless communication, and a second communication apparatus that is provided with a second wireless communication unit that is capable of performing wireless communication and a reading unit configured to read an image, comprising:
    causing the first communication apparatus to perform:
    registering first network information;
    causing the image forming unit to form one image based on second network information;
    establishing direct wireless communication based on a request from the second communication apparatus; and transmitting the first network information to the second communication apparatus using the direct wireless communication according to establishment of the direct wireless communication, and causing the second communication apparatus to perform:

reading a sheet on which the one image has been formed, using the reading unit, to acquire the second network information;

requesting the first communication apparatus to establish direct wireless communication based on the second network information;

acquiring the first network information from the first communication apparatus using the direct wireless communication; and performing control for connecting to one access point based on the first network information and starting wireless LAN communication.

10. A non-transitory computer-readable storage medium storing a program for causing computers to execute the operations of the units of the communication system according to claim 1.

* * * * *